Oct. 30, 1956    C. L. CAMPBELL    2,768,707
SEPARATOR FOR USE WITH VACUUM CLEANING
Filed Jan. 4, 1954
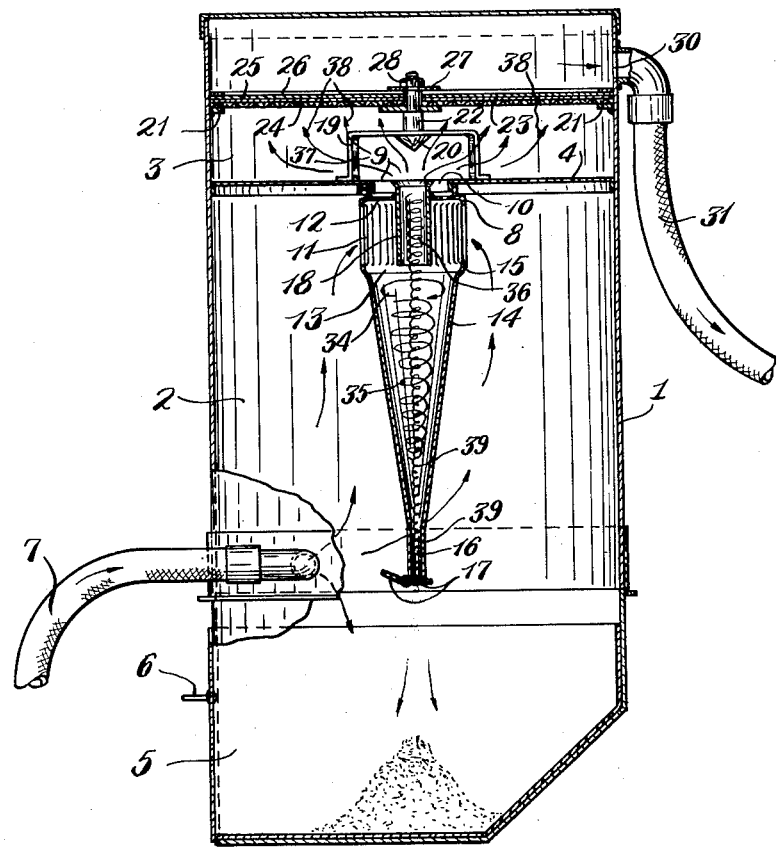
INVENTOR.
CHARLES LANGDON CAMPBELL
BY
his ATTORNEY United States Patent Office 2,768,707
Patented Oct. 30, 1956

2,768,707

SEPARATOR FOR USE WITH VACUUM CLEANING

Charles Langdon Campbell, Painesville, Ohio, assignor to Centrifix Corporation, Cleveland, Ohio, a corporation of Ohio Application January 4, 1954, Serial No. 401,977

2 Claims. (Cl. 183—83)

This invention relates to an apparatus for separating particles entrained in a fluid by imparting a relatively high whirling action to the laden fluid and more particularly relates to apparatus of this type which is adapted for use in efficiently separating dust, finely divided particles and the like, such as in connection with vacuum cleaning apparatus, dried dairy and food products in particle form, and other material particles carried by a fluid medium, such as those sprayed into a drying chamber to be subsequently separated from the fluid medium in which they are entrained.

It is one of the objects of this invention to provide an apparatus of the above mentioned type which possesses extremely high operating efficiency.

A further object of the invention is the provision of such an apparatus having an extremely low pressure drop.

A further object of the invention is an apparatus having no moving parts necessary to the efficient separation of solid particles from a fluid in which they are originally entrained.

Another object of the invention is the provision of a fixed centrifugal means for imparting a relatively high velocity whirl to the laden fluid with which is associated means for effectively and progressively agglomerating the particles in the whirling fluid sufficiently to cause the agglomerated particles to pass downwardly by gravity out of the whirling zone and into a receiver while the fluid passes in a spiral whirling movement upwardly to a fluid outlet.

Another object of the invention is the provision of an apparatus of the above mentioned type which is of simple construction, efficient in operation and which because of the absence of moving parts and the construction of the device will require little or no maintenance in assuring its efficient operation.

Another object is the provision of a device of this character which can easily be dismantled for cleaning or repair.

Another object of the invention is an apparatus for separating dust, finely divided particles and the like from air, gas or vapor laden therewith, including a primary whirl promoting tuyere and a passage communicating with the interior of the tuyere and progressively diminishing in cross sectional area from the tuyere to its discharge end whereby said particles may be discharged from the passage and the unladen whirling fluid is subjected to a secondary or spiral travel along the passage in an opposite direction through the tuyere.

A still further object of the invention is an apparatus of the above identified type which can be manufactured at low cost.

Another object is a new method for separating finely divided solid particles from an entraining fluid.

Other objects and advantages of my invention will become more apparent as the following description of an embodiment thereof progresses, reference being had to the accompanying drawing in which like reference characters are employed to designate like parts.

In the drawing:

The figure is a vertical section through a device embodying my invention in which certain parts are shown in elevation.

Referring more specifically to the embodiment shown in the drawing wherein the invention is applied to the separation of dust or other finely divided particles from a fluid stream which entrains them as, for instance, a vacuum cleaning apparatus, apparatus for separating dried dairy, food and other products in finely divided form from an entraining fluid may include a casing or housing 1 having provided therein a separation chamber 2 and a discharge chamber 3 separated by the partition 4 which preferably is disposed laterally of the container 1. In the bottom of the separation chamber there may be provided a pan 5 having a handle 6, the pan being provided for the purpose of receiving dust or other particles separated from the laden stream.

In using the device, a hose 7 conveys the laden fluid in the direction of the arrow to the interior of the separation chamber 2. The conduit or hose 7 may be coupled at one end to the wall of the separation chamber either radially of the chamber or tangentially thereof, as shown in the figure. When the connection is made in the tangential relation, the fluid is given an initial rotary motion as it enters the chamber and progresses upwardly to the tuyere which is indicated generally at 8. The other end of the hose of course receives the laden fluid from any suitable source such as a vacuum cleaner head, receivers for finely divided particles sprayed into a drying atmosphere such as dried milk or egg and other particles, and like apparatus. The partition 4 has a central opening indicated at 9 which is defined by the depending annular flange 10 projecting into the separation chamber 2.

The tuyere 8 is of the fixed type and comprises essentially a cylindrical body 8 having a plurality of uniformly spaced tangential blades 11 formed therein around its outer circumference. It will be noted that the tuyere 8 is closed at its upper end by the wall 12 while its bottom end 13 is open and communicates with an elongated cone 14 which is secured at its open base with the bottom of the tuyere as at 15. The cone is elongate and its side walls define a relatively sharp angle, the lower end of the cone terminating in a restricted discharge passage 16 through which the separated particles are caused to pass in discharging these particles into the pan 5. I have provided a flop valve 17 which is of the usual type remaining in closed position as shown in the drawing until the weight of the particles accumulating above in the restricted lower portion of the cone at 16 is sufficient to overcome the valve balance, at which time the particles will be allowed to pass downwardly into the pan 5 whereupon the valve will again assume its closed position.

Within the tuyere 8 I provide a tube 18 which is axially aligned within the tuyere and within the axis of the cone. This tube is open at both ends, its upper end passing through the solid wall 12 of the tuyere and extending up into the opening 9 of the partition 4, the lower end of the tube 18 opening into the base of the tuyere and also into the base of the cone 14.

I have provided means for diffusing fluids passing upwardly through the tube 18 and into the discharge chamber 3 which may consist of a support 19 straddling the central opening 9 and which supports an inverted cone shaped diffusing member 20 axially above the open upper end of the tube 18 a sufficient distance to effectively diffuse the fluid stream as it passes upwardly through the tube 18 and outwardly into the discharge chamber 3.

If desired, I may provide a composite filter means within the discharge chamber which extends transversely of the chamber and is supported peripherally by means of supports 21 secured at spaced intervals to the inner wall of the chamber and supported centrally by means of a stud 22 axially positioned with respect to the tube 18 and the diffuser 20 on the support 19. A plate 23 is carried by the stud and serves as a center support for the composite filter which may consist of a plurality of discs of filter material such as the bottom coarse mesh disc 23 and a disc of filter paper 25 over which may be placed a disc of open mesh material as at 26. These discs superimposed one above the other are clamped in place by means of the washer 27 and the nut 28 threaded on the end of the stud 22.

A discharge outlet is formed in the housing as at 30 above the level of the composite filter for discharging the unladen fluid through the conduit 31 which, in the case of vacuum type equipment, may be connected with a suction source.

The path of laden fluid passing into, through and out of the apparatus is indicated by arrows and more particularly by the arrows within the tuyere and the cone and through the tube 18 and into the discharge chamber 3.

As indicated, it will be noted that the laden fluid passing into the receiving and separation chamber 2 from the inlet conduit 7 will rise toward the top of the chamber and will enter the tuyere 8 between the vertically disposed tangentially arranged spaced blades 11 formed in the periphery of the tuyere, to the interior of the tuyere and in so doing will be subjected to a whirling motion within the tuyere at relatively high velocity. Since the tuyere is closed at its upper end, the whirling laden fluid will tend to move in a downward direction through the open end of the tuyere and into the upper portion of the cone 14 as indicated by the arrows 34. By virtue of the centrifugal forces set up in the whirling fluid, particles entrained therein will be thrust radially outwardly of the column toward the converging cone walls and some of them will be deposited directly downwardly along the cone inner side wall to the discharge end of the cone. It will be noted that as the whirling column moves downwardly in the cone, as represented generally by the arrows 35, the progressively reduced sectional area of the cone will progressively restrict the centrifugal area of separation tending to agglomerate those particles still entrained toward the axis of the whirling fluid body. Since a low pressure head is established above and within the tube 18 by virtue of the suction established in the conduit 31, a relatively high pressure area will be present in the cone 14 particularly near the top thereof. This differential of pressure will of course have a tendency to draw the whirling fluid column from a point within the cone 14 below the base thereof, upwardly through the tube 18, as indicated by the arrows 36, and while still in a whirling condition deliver the same upwardly toward the diffuser 20, as indicated by the arrows 37, where the fluid column will be diffused in the direction of the arrows 38 indicated in the chamber 3.

The agglomerated particles will by the force of gravity move downwardly through the vortex created in the cone 14 and will of course pass to the valved lower end of the cone 14, as indicated at 39, where the same may be accumulated within the restricted neck of the cone until such time as the weight thereof overcomes the balance of the flop valve 17 whereupon the accumulated particles will be discharged into the pan 5 where at times they may be removed by removing the pan and dumping the same into some convenient container.

It will be understood that my invention is intended broadly as a means for effectively and efficiently separating dust and other finely divided particles, such as particles of food and other materials which have been sprayed into a dry atmosphere from a fluid such as air, gas or the like, in which the particles are suspended or are entrained, by directing the laden fluid through an apparatus of the type disclosed herein, that is, by initially imparting to the laden fluid a violent whirling motion and by directing the whirling laden fluid into an area of differential pressure wherein is provided means for agglomerating the particles by progressively confining them in an area of decreased cross sectional dimension to ultimately release the particles from the fluid stream by the action of gravity and to thereby permit the unladen stream to pass in another direction than that of the particles in response to a differential of pressure in the path of travel of the fluid.

I have discovered that such means is highly effective in efficiently separating dust from an air fluid stream as applied to vacuum cleaning apparatus, and in the field of separating finely divided particles of other types such as food particles, more specifically milk and egg particles which have been sprayed into a drying atmosphere and which are thus entrained in a fluid stream to be passed through an apparatus involving my invention.

A suction pump, fan or pressure device may be employed to cause the fluid stream to move through the apparatus. When employed with vacuum cleaning apparatus, for instance, the conduit 31 and opening 30 are connected with a source of suction (not shown), while in other uses it may be desirable to employ pressure pumps, fans or the like (not shown) to move the fluid stream through the apparatus.

Various changes may be made in the details of construction and arrangement of parts of the invention without departing from the spirit thereof or the scope of the appended claims.

I claim:

1. In a device for separating solid particles from a fluid in which they are entrained, a housing, a partition dividing the housing into a separation chamber having an inlet for the laden fluid, and a discharge chamber having an outlet for the unladen fluid, a fixed tuyere secured adjacent the partition in the separation chamber for imparting a whirling motion to the laden fluid as it passes into the tuyere, said tuyere being closed at one end and open at its other end, an open tube in said tuyere communicating at one end with the discharge chamber, the other end of said tube extending into the open end of said tuyere, and means for progressively agglomerating particles in the whirling stream leaving the tuyere, said means having direct communication with the open end of the tuyere and with one open end of said tube and including an elongate open cone conected at its base directly with the open end of the tuyere and directly with the extending open end of the tube, the other open end of the tube extending into said position to deliver the unladen fluid from the cone to the discharge chamber, said cone having a restricted apex opening at its discharge end to deliver the separated particles into said housing lower portion.

2. In a device for separating solid particles from a fluid in which they are entrained, a housing, a partition dividing the housing into a separation chamber having an inlet for the laden fluid, and a discharge chamber having an outlet for the unladen fluid, a fixed tuyere secured adjacent the partition in the separation chamber for imparting a whirling motion to the laden fluid as it passes into the tuyere, said tuyere being closed at one end and open at its other end, an open tube in said tuyere communicating at one end with the discharge chamber, the other end of said tube extending into the open end of said tuyere, and means for agglomerating particles in the whirling stream leaving the tuyere, said means comprising a hollow cone of greater length than that of the tuyere terminating in a lower end below said inlet in the separation chamber and connected with the open end of said tuyere at its base, said base opening being coextensive with the open end of the tuyere and directly communicating therewith, the other end of the cone terminating in a restricted opening for discharging the particles separated from the fluid body in the tuyere and cone into the bottom of the separation chamber.

References Cited in the file of this patent

UNITED STATES PATENTS

| | | |
|---|---|---|
| 967,849 | Steiner | Aug. 16, 1910 |
| 1,373,466 | Tweit | Apr. 5, 1921 |
| 1,917,606 | Sillers | July 11, 1933 |
| 1,953,786 | Sullivan | Apr. 3, 1934 |
| 2,281,610 | Watson et al. | May 5, 1942 |
| 2,583,696 | Held et al. | Jan. 29, 1952 |

FOREIGN PATENTS

| | | |
|---|---|---|
| 18,409 | Great Britain | Aug. 25, 1904 |
| 19,642 | Great Britain | Oct. 19, 1895 |
| 891,643 | France | May 2, 1944 |

(Addition to No. 55,753.)